(12) United States Patent
Johnson, II et al.

(10) Patent No.: US 11,794,159 B2
(45) Date of Patent: Oct. 24, 2023

(54) PROCESS AND APPARATUS FOR CONTACTING FEED AND CATALYST WITH IMPROVED CATALYST MIXING

(71) Applicant: UOP LLC, Des Plaines, IL (US)

(72) Inventors: Richard A. Johnson, II, Algonquin, IL (US); Wolfgang A. Spieker, Glenview, IL (US); Mohammad-Reza Mostofi-Ashtiani, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/553,717

(22) Filed: Dec. 16, 2021

(65) Prior Publication Data

US 2023/0191350 A1 Jun. 22, 2023

(51) Int. Cl.
*B01J 8/00* (2006.01)
*B01J 8/18* (2006.01)
*B01J 8/32* (2006.01)
*B01J 23/92* (2006.01)

(52) U.S. Cl.
CPC ............ *B01J 8/0095* (2013.01); *B01J 8/005* (2013.01); *B01J 8/0025* (2013.01); *B01J 8/1872* (2013.01); *B01J 8/32* (2013.01); *B01J 23/92* (2013.01); *B01J 2208/00805* (2013.01); *B01J 2208/00823* (2013.01); *B01J 2208/00946* (2013.01)

(58) Field of Classification Search
CPC ... B01J 8/32; B01J 8/1872; B01J 8/005; B01J 8/0095; B01J 2208/00017; B01J 2208/0038; B01J 2208/00805; B01J 2208/00823; B01J 2208/00946; B01J 2208/00752
See application file for complete search history.

(56) References Cited

U.S. PATENT DOCUMENTS

| 4,071,573 | A | * | 1/1978 | Owen ...................... C10G 3/62 585/408 |
| 4,234,411 | A | | 11/1980 | Thompson |
| 7,169,293 | B2 | * | 1/2007 | Lomas ....................... B01J 8/28 422/142 |
| 9,233,885 | B2 | * | 1/2016 | Stevens ...................... B01J 8/26 |
| 11,491,453 | B2 | * | 11/2022 | Senetar .................... B01J 4/001 |
| 2005/0074371 | A1 | | 4/2005 | Lomas |
| 2011/0218373 | A1 | | 9/2011 | Qi et al. |
| 2013/0025281 | A1 | | 1/2013 | Jiang et al. |
| 2015/0361362 | A1 | | 12/2015 | Daggupati et al. |

OTHER PUBLICATIONS

Search Report and Written Opinion for PCT/US2022/081268 dated Apr. 17, 2023.

* cited by examiner

*Primary Examiner* — Lessanework Seifu
(74) *Attorney, Agent, or Firm* — Paschall & Associates, LLC; James C. Paschall

(57) ABSTRACT

A process and reactor for contacting a feed stream with a catalyst stream comprises a reaction chamber comprising two spent catalyst inlets for delivering two spent catalyst streams to the reaction chamber and at least one regenerated catalyst inlet for delivering a regenerated catalyst stream to the reaction chamber. The reaction chamber may also include a second regenerated catalyst inlet for delivering a second regenerated catalyst stream to the reaction chamber. The second spent catalyst inlet enables thorough mixing of catalyst streams.

10 Claims, 3 Drawing Sheets

PROCESS AND APPARATUS FOR CONTACTING FEED AND CATALYST WITH IMPROVED CATALYST MIXING

FIELD

The field is the reaction of feed with fluid catalyst. The field may particularly relate to reacting a feed with a fluid catalyst to catalyze a reaction.

BACKGROUND

Light olefin production is vital to the production of sufficient plastics to meet worldwide demand. Paraffin dehydrogenation (PDH) is a process in which light paraffins such as ethane and propane can be dehydrogenated to make ethylene and propylene, respectively. Dehydrogenation is an endothermic reaction which requires external heat to drive the reaction to completion.

Dehydrogenation catalyst may incorporate a dehydrogenation metal such as gallium with a molecular sieve or an amorphous material. The catalyst must be sufficiently robust and appropriately sized to be able to resist the attrition expected in a fluidized system.

Fluid catalytic reactions include PDH, fluid catalytic cracking (FCC), toluene methylation and others. The fluid catalyst is contacted with hydrocarbon feed to make product gas and then separated from the catalyst. In hydrocarbon reactions with fluidized catalyst, coke can deposit on the catalyst while catalyzing the reaction. The spent catalyst may be regenerated in a catalyst regenerator by combusting coke from the catalyst in the presence of oxygen. In some cases, additional fuel may be combusted in the regenerator to increase the temperature of the regenerated catalyst. The hot regenerated catalyst may then be transferred back to the reactor to catalyze the reaction. Some of the spent catalyst separated from the product gas may be circulated to the reactor without regeneration to provide more catalyst to the reactor.

For a given temperature in the regenerator, additional heat can be provided to the reaction through increased catalyst circulation and by increasing the temperature of regenerated catalyst. The drawback of increased regeneration temperature is, however, that contacting feed with regenerated catalyst at higher temperature leads to additional thermal cracking reactions. Catalytic reactions are more selective to the desired products than thermal cracking reactions. Care must be taken to maximize catalytic reactions over thermal cracking reactions. Maximizing catalytic reactions requires promoting thorough contact between catalyst and reactant feed. Thermal reactions can be undesirably promoted by hot spots which are regions of much higher temperature than other regions in the reactor.

In fluidized catalytic reactors with spent catalyst recycled back to the reactor along with hot regenerated catalyst, disparities in catalyst temperature can occur. Disparities can increase the propensity for hot spots which can promote unselective, thermal reactions.

There is a need, therefore, for improved processes and apparatuses for thoroughly mixing catalyst that contacts feed to maximize catalytic reactions over thermal reactions to improve product selectivity.

BRIEF SUMMARY

A process and reactor for contacting a feed stream with a catalyst stream comprises a reaction chamber. The reaction chamber comprises two spent catalyst inlets for delivering two spent catalyst streams to the reaction chamber and at least one regenerated catalyst inlet for delivering a regenerated catalyst stream to the reaction chamber. The reaction chamber also includes a feed inlet for charging feed to the reaction chamber. The reactor also includes a separation chamber in communication with the reaction chamber and a product outlet for removing a product stream from the separation chamber. The reaction chamber may also include a second regenerated catalyst inlet for delivering a second regenerated catalyst stream to the reaction chamber. Delivery of two spent catalyst streams and perhaps two regenerated catalyst streams to the reactor fosters improved mixing of catalyst and reduced variation of catalyst temperature and density in the reactor.

DEFINITIONS

Figure 1:
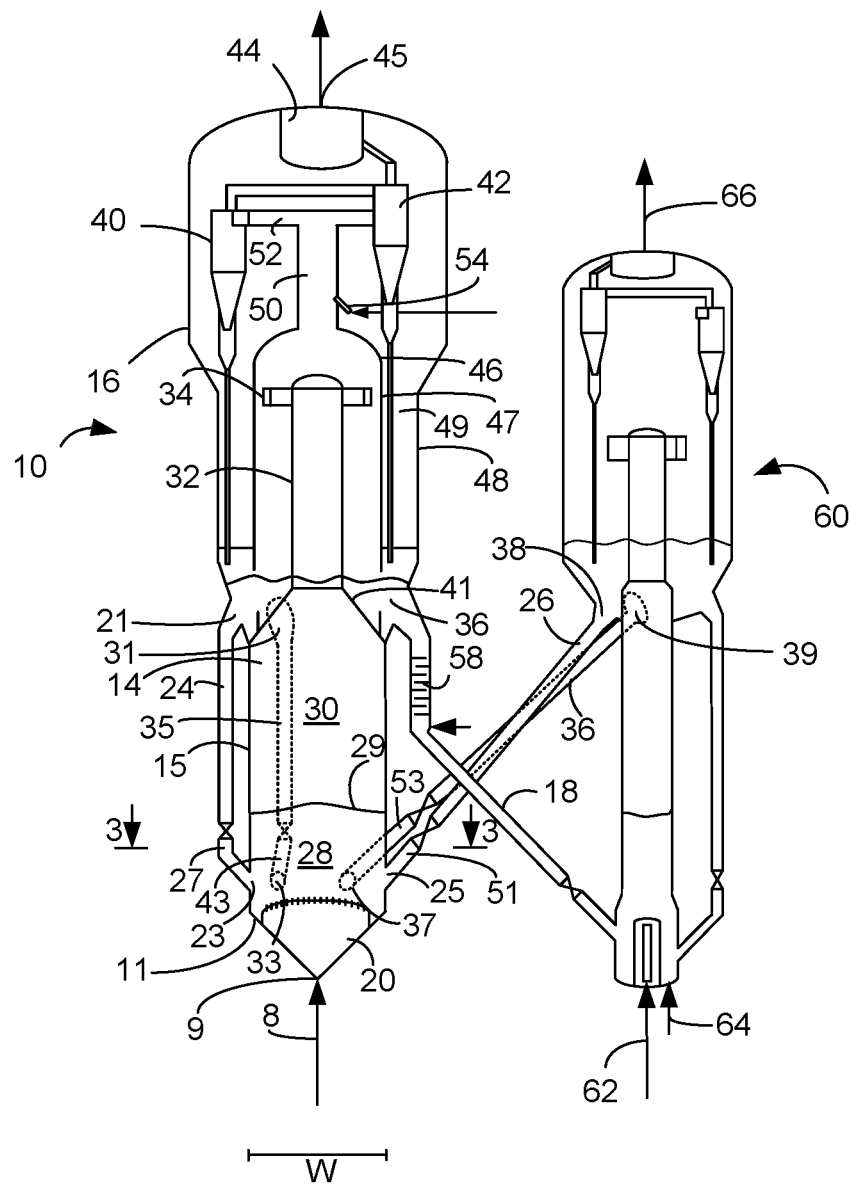
FIG. 1 is a schematic drawing of a process and apparatus of the present disclosure.

The term "communication" means that fluid flow is operatively permitted between enumerated components, which may be characterized as "fluid communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "bypass" means that the object is out of downstream communication with a bypassing subject at least to the extent of bypassing.

As used herein, the term "predominant" or "predominate" means greater than 50%, suitably greater than 75% and preferably greater than 90%.

DETAILED DESCRIPTION

A favorable design configuration of a fluidized reactor for fluidized catalytic reactions that leads to improved catalyst mixing and overall process efficiency. A new configuration of the catalyst return into the fluidized bed is presented that produces a more uniform bed density and temperature profile, resulting in increased conversion and selectivity. The reactor will feature two spent catalyst inlets for spent catalyst recycled from a separation chamber to a reaction chamber and at least one inlet for regenerated catalyst returning from the regenerator. The catalyst streams may be introduced into the reaction chamber of the reactor horizontally with the two recycle spent catalyst pipes at an obtuse angle between them and across from at least one and perhaps at least two regenerated catalyst pipes which may be arranged nearly perpendicularly to each other. The catalyst inlets may be equipped with ramps projecting catalyst upwardly in the reactor.

The process and apparatus may be applicable to any fluid catalytic reactor or process. We have found that the process and apparatus are particularly advantageous in a fluidized PDH process. So, the process and apparatus will be described herein in the context of a PDH process.

The conditions in a dehydrogenation reactor may include a temperature of about 500 to about 800° C., a pressure of about 40 to about 310 kPa and a catalyst to feed ratio of about 5 to about 100. The dehydrogenation reaction may be conducted in a fluidized manner such that gas, which may comprise the reactant paraffins with or without a fluidizing inert gas, is distributed to the reactor in a way that lifts the dehydrogenation catalyst in the reactor vessel while catalyzing the dehydrogenation of paraffins. During the catalytic dehydrogenation reaction, coke is deposited on the dehydrogenation catalyst leading to reduction of the activity of the catalyst. The dehydrogenation catalyst must then be regenerated.

An exemplary PDH reactor 10 and regenerator 60 are shown in FIG. 1. The PDH reactor 10 may comprise two chambers, a reaction chamber 14 and a separation chamber 16. A feed line 8 may charge a feed stream of paraffins to the reactor 10 through a feed inlet 9 to the reaction chamber 14. The feed stream may predominantly comprise propane or butane, but other paraffins such as ethane may be present in the feed stream in conjunction with or to the exclusion of other paraffins. Any suitable feed distributor can be used to distribute the feed stream to the reaction chamber 14. A domed feed distributor 20 may be utilized in the reaction chamber 14 of the reactor 10. The domed feed distributor 20 receives a gaseous paraffinic feed stream and distributes the feed stream through nozzles in the top dome of the domed reactant distributor 20 to distribute the feed stream across the entire cross section of the reaction chamber 14. It is envisioned that other fluidizing gases may be used to also promote fluidization in the reaction chamber 14. In an embodiment, the distributed feed stream and catalyst ascend in the reaction chamber 14 and the reactor 10.

The reaction chamber 14 includes a first spent catalyst inlet 23 for delivering a first spent catalyst stream to the reaction chamber and a second spent catalyst inlet 33 for delivering a second spent catalyst stream to said reaction chamber. The reaction chamber 14 also includes a first regenerated catalyst inlet 25 for delivering a first regenerated catalyst stream to the reaction chamber. The reaction chamber 14 may also include a second regenerated catalyst inlet 37 for delivering a second regenerated catalyst stream to the reaction chamber.

The reactor 10 includes a first spent catalyst pipe 24 having a first spent catalyst inlet end 27 comprising the first spent catalyst inlet 23 connected to the reaction chamber 14 and a first spent catalyst outlet end connected to said separation chamber 16 comprising the first spent catalyst outlet 21. The reactor 10 also includes a second spent catalyst pipe 35 shown in phantom because it is behind the reactor. The second spent catalyst pipe 35 has a second spent catalyst inlet end 43 comprising the second spent catalyst inlet 33 connected to the reaction chamber 14 and a second spent catalyst outlet end connected to the separation chamber comprising the second spent catalyst outlet 31. The reactor 10 also includes a first regenerated catalyst pipe 26 having a first regenerated catalyst inlet end 51 comprising the first regenerated catalyst inlet 25 connected to the reaction chamber 14 and a first regenerated catalyst outlet end connected to the regenerator vessel 60 comprising a first regenerator catalyst outlet 38. The reactor 10 may also include a second regenerated catalyst pipe 36 having a second regenerated catalyst inlet end 53 comprising the second regenerated catalyst inlet 37 connected to the reaction chamber 14 and a second regenerated catalyst outlet end connected to a regenerator vessel 60 comprising a second regenerated catalyst outlet 39. Parts of the second regenerated catalyst pipe 36, the second regenerated catalyst inlet 37 and the second regenerated catalyst outlet 39 are shown in phantom because they are behind the reactor 10, the first regenerated catalyst pipe 26 and the regenerator 60.

The reaction chamber 14 comprise a vertical wall 15 which may be cylindrical. The vertical wall may define an inner diameter W of the reaction chamber 14. The vertical wall 15 extends between two graduated sections of decreasing inner diameters moving away from the vertical wall: a bottom distribution section 11 and an upper transition section 41.

In the reaction chamber 14 the first spent catalyst stream, the second spent catalyst stream, the first regenerated catalyst stream and optionally the second regenerated catalyst stream mix together in a dense bed 28 of mixed catalyst having an upper interphase 29. The height of dense catalyst bed may be adjusted via catalyst recycle through the first spent catalyst inlet 23 and the second spent catalyst inlet 33 to achieve the desired weight hourly space velocity (WHSV).

The feed stream is contacted with the mixed catalyst in the dense bed 28, and the reactant paraffins undergo endothermic conversion to olefins, typically propane to propylene. The feed stream and the catalyst rise from the dense bed 28 in the reaction chamber 14 of the reactor 10 impelled by the feed stream continually entering the reactor and molar expansion and enter into a dilute phase 30.

At an interface 29, the fluid dynamics transition from a dense bed 28 of catalyst below the interface preferably to a fast-fluidized flow regime in the dilute phase region 30. The catalyst density in the dense bed of catalyst is about 320 kg/m$^3$ (20 lb/ft$^3$) to about 480 kg/m$^3$ (30 lb/ft$^3$); whereas the catalyst density in the dilute phase is about 100 kg/m$^3$ (6.3 lb/ft$^3$) to about 160 kg/m$^3$ (10 lb/ft). The superficial velocity of the feed stream and the stream of mixed catalyst ascending in the reaction chamber 14 will typically be at least about 1.2 m/s (4 ft/s) to about 2.4 m/s (8 ft/s) to provide the fast-fluidized flow regime. The gaseous feed stream and mixed catalyst ascend in a fast-fluidized flow regime in which catalyst may slip relative to the gas and the gas can take indirect upward trajectories.

The dehydrogenation catalyst selected should minimize cracking reactions and favor dehydrogenation reactions. Suitable catalysts for use herein include an active metal which may be dispersed in a porous inorganic carrier material such as silica, alumina, silica alumina, zirconia, or clay. An exemplary embodiment of a catalyst includes alumina or silica-alumina containing gallium, a noble metal, and an alkali or alkaline earth metal.

The catalyst support comprises a carrier material, a binder and an optional filler material to provide physical strength and integrity. The carrier material may include alumina or silica-alumina. Silica sol or alumina sol may be used as the binder. The alumina or silica-alumina generally contains alumina of gamma, theta and/or delta phases. The catalyst support particles may have a nominal diameter of about 1 to about 200 micrometers with the average diameter of about 50 to about 150 micrometers. Preferably, the surface area of the catalyst support is about 85 to about 140 m²/g.

The dehydrogenation catalyst may comprise a dehydrogenation metal on a support. The dehydrogenation metal may be a one or a combination of transition metals. A noble metal may be a preferred dehydrogenation metal such as platinum or palladium. Gallium is an effective metal for paraffin dehydrogenation. Metals may be deposited on the catalyst support by impregnation or other suitable methods or included in the carrier material or binder during catalyst preparation.

The acid function of the catalyst should be minimized to prevent cracking and favor dehydrogenation. Alkali metals and alkaline earth metals may also be included in the catalyst to attenuate the acidity of the catalyst. Rare earth metals may be included in the catalyst to control the activity of the catalyst. Concentrations of 0.001% to 10 wt % metals may be incorporated into the catalyst. In the case of the noble metals, it is preferred to use about 10 parts per million (ppm) by weight to about 600 ppm by weight noble metal. More preferably it is preferred to use about 10 to about 100 ppm by weight noble metal. The preferred noble metal is platinum. Gallium should be present in the range of about 0.3 wt % to about 3 wt %, preferably about 0.5 wt % to about 2 wt %. Alkali and alkaline earth metals are present in the range of about 0.05 wt % to about 1 wt %.

The feed stream lifts a mixed stream of catalyst upwardly in the reaction chamber while paraffins convert to olefins in the presence of the dehydrogenation catalyst. The catalyst gradually becomes spent catalyst attributed to the accumulation of coke on the catalyst. A fluidizing inert gas may be distributed to the reaction chamber 14 to assist in lifting the mixture of catalyst and reactants upwardly in the reaction chamber. The feed gases convert to product gases while ascending in the reaction chamber 14. The blend of gases and catalyst ascend from the reaction chamber 14 through a frustoconical transition section 41 into a transport riser 32 which has a smaller diameter than an inner diameter of the reaction chamber 14. A blend of gases and catalyst accelerate in the narrower transport riser 32 and are discharged from a primary catalyst separator 34 into the separation chamber 16. The separation chamber 16 is in downstream communication with the reaction chamber 14. The primary catalyst separator 34 may be a riser termination device that utilizes horizontal, centripetal acceleration to separate spent catalyst from product gas. Arcuate ducts of the primary catalyst separator 34 direct the mixture of product gas and catalyst to exit from the riser 32 in a typically horizontally angular direction to centripetally accelerate causing the denser catalyst to gravitate outwardly. The catalyst loses angular momentum and falls into a separator catalyst bed 36 depicted with an upper interphase. The lighter gases ascend in the separation chamber 16 and enter into cyclones 40, 42. The cyclones 40, 42 may comprise first and second cyclonic stages of separation to further remove catalyst from product gases. The product gas is ducted to a plenum 44 from which it is discharged from the reactor 10 through a product outlet 45 in a product line. The product outlet 45 removes a product stream from the separation chamber 14. The superficial gas velocity in the transport riser 32 will be about 12 m/s (40 ft/s) to about 20 m/s (70 ft/s) and have a density of about 64 kg/m³ (4 lb/ft³) to about 160 kg/m³ (10 lb/ft³), constituting a dilute catalyst phase.

Catalyst separated from the product gas by the primary catalyst separator 34 drops into the dense catalyst bed 36. In an aspect, primary cyclones 40 may collect product gas from the separation chamber 16 and transport the product gas separated from catalyst to a secondary cyclone 42 to further separate catalyst from the product gas before directing secondarily purified product gas to the plenum 44. Catalyst separated from product gas in the cyclones 40, 42 is dispensed by dip legs into the dense catalyst bed 36. At this point, the separated catalyst in the separation chamber 16 is considered spent catalyst because deposits of coke are accumulated thereon. A regenerator catalyst stream taken from the spent catalyst collected in the dense bed 36 in the separation chamber 16 is transported in a regenerator catalyst pipe 18 to a catalyst regenerator 60 to have coke burned from the catalyst to regenerate and heat the dehydrogenation catalyst. The spent catalyst in the regenerator catalyst stream may be stripped in a stripping vessel 58 in route to the regenerator catalyst pipe 18 by counter-current contact with an inert gas stream to push hydrocarbons back into the reactor 10 for recovery. The stripping vessel 58 may depend from the separation vessel 16.

Spent catalyst streams are recycled from the spent catalyst collected in the dense bed 36 of the separation chamber 16. The separation chamber 16 includes the first spent catalyst outlet 21 and the second spent catalyst outlet 31 connected to the separation chamber. The first spent catalyst stream enters the first spent catalyst outlet 21 comprised of the first spent catalyst outlet end of the first spent catalyst pipe 24 and is recycled to the reaction chamber 14 through the first spent catalyst inlet 23. The second spent catalyst stream enters the second spent catalyst outlet 31 comprised of the second spent catalyst outlet end of the second spent catalyst pipe 35 and is recycled to the reaction chamber 14 through the second spent catalyst inlet 33. The first spent catalyst stream and the second spent catalyst stream are not regenerated before they recycle to the reaction chamber 14.

The separation chamber 16 may include a disengagement can 46 that surrounds the upper end of the riser 32 and the primary separator 34. A vertical wall 47 of the disengagement can 46 is spaced apart from a shell 48 of the separation chamber to define an annulus 49. Dip legs of the cyclones 40 and 42 may be located in the annulus 49. The disengagement can 46 serves to limit travel of the product gas exiting the primary separator 34, so as to reduce its time in the reactor 10, thereby mitigating unselective cracking reactions to undesired products. The top of the disengagement can 46 may be hemispherical and feed a gas recovery conduit 50 that transports product gases to ducts 52 that are directly ducted or connected to the primary cyclones 40. The direct ducting from the disengagement can 46 to the primary cyclones 40 also prevents product gas from getting loose in the larger volume of the separation chamber 16 where excessive residence time may occur to permit unselective cracking. Windows in the lower section of the wall 47 of the disengagement can 46 permit catalyst in the disengagement can 46 to enter into the first spent catalyst pipe 24 through the first spent catalyst inlet 21, the second spent catalyst pipe 35 through the second spent catalyst inlet 31 and the regenerator catalyst pipe 18. A quench fluid such as condensed product liquid, cooled recycled gas, or even cool catalyst may be injected into the product gases through a quench nozzle 54 to cool the product gases to below cracking temperature to limit unselective thermal cracking. Quench fluid is advantageously injected into the gas recovery conduit 50 which directs the separated product gas to a narrowed location. The gas recovery conduit 50 is in downstream communication with primary catalyst separator 34 which separates the predominance of the spent catalyst from the product gases. The primarily separated spent catalyst bypasses quenching to retain heat in the catalyst. The product gases separated from the predominance of the catalyst subjects a reduced mass of material to quenching thereby requiring less quench fluid to achieve sufficient cooling to reduce the temperature of product gas to below cracking temperature.

The spent catalyst stripped with inert gas in the stripping vessel 58 may be transported to the catalyst regenerator vessel 60 in the regenerator catalyst pipe 18 to regenerate the spent catalyst into regenerated catalyst by combusting coke with oxygen which may be provided in air from line 62 that is present on the spent catalyst. Fuel gas may be added to the catalyst regenerator vessel 60 in line 64 to further heat catalyst by combustion. Flue gas generated by combustion is separated from the regenerated catalyst and discharged through a flue gas line 66. The first regenerated catalyst pipe 26 transports the first regenerated catalyst stream from the regenerator 60 to the reactor 10 through a control valve thereon through the first regenerated catalyst inlet 25. The second regenerated catalyst pipe 36 may transport the second regenerated catalyst stream from the regenerator 60 to the reactor 10 through a control valve thereon through the second regenerated catalyst inlet 37.

The regenerated catalyst is passed to the reaction chamber 14 at a hotter temperature than the spent catalyst passed to the reaction chamber. To promote catalytic dehydrogenation reactions over thermal cracking reactions, the catalyst temperature and density should be brought within a tight temperature range and density range with minimized variation. Hot catalyst regions will undesirably promote unselective thermal cracking reactions.

Figure 2:
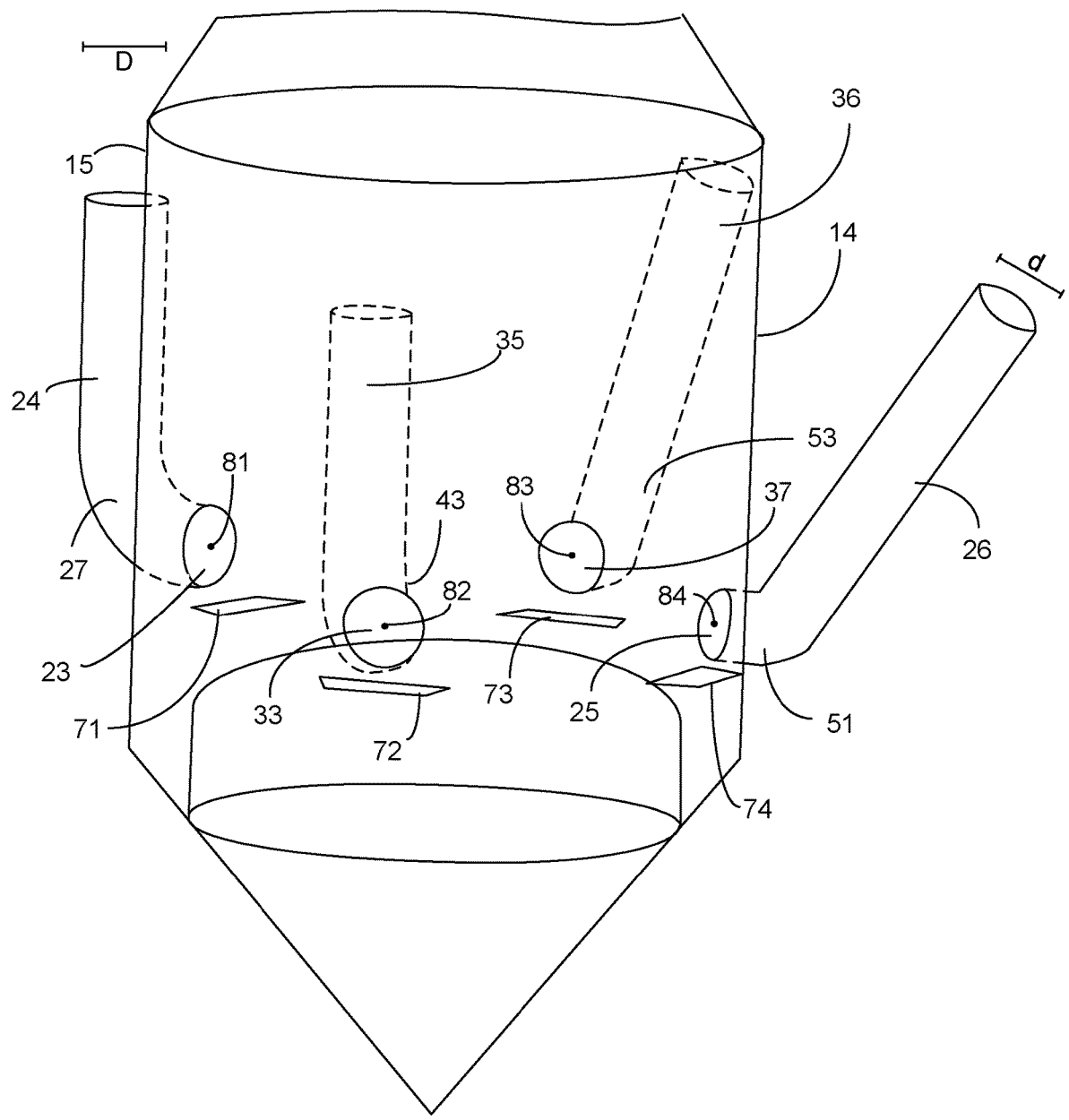
FIG. 2 is an isometric partial view of the reaction chamber.

FIG. 2 presents an isometric view of the reaction chamber 14. Inlet ends 27, 43, 51 and 53 of each catalyst pipe 24, 35, 26 and 36, respectively, are shown. The first spent inlet end 27 of the first spent catalyst pipe 24 comprising the first spent catalyst inlet 23 provides the first spent catalyst stream to the reaction chamber 14. The second spent inlet end 43 of the second spent catalyst pipe 35 comprising the second spent catalyst inlet 33 provides the second spent catalyst stream to the reaction chamber 14. The first regenerated inlet end 51 of the first regenerated catalyst pipe 26 comprising the first regenerated catalyst inlet 25 provides the first regenerated catalyst stream to the reaction chamber 14. In an embodiment, the second regenerated inlet end 53 of the second regenerated catalyst pipe 36 comprising the second regenerated catalyst inlet 37 provides the second regenerated catalyst stream to the reaction chamber 14. Each of the catalyst inlets have an axial center in a circle defined by the inlet. The first spent inlet 23 has a first spent center 81. The second spent inlet 33 has a second spent center 82. The first regenerated inlet 25 has a first regenerated center 83. The optional second regenerated inlet 37 may have a second regenerated center 84. Axial centers 81 and 82 of the first spent catalyst inlet 23 and the second spent catalyst inlet 33, respectively, may be higher in elevation than the axial centers 83 and 84 of the first regenerated catalyst inlet 25 and the second regenerated catalyst inlet 37, respectively.

The first spent catalyst pipe 24 and the second spent catalyst pipe 35 may have the same inner diameter, D. The first regenerated catalyst pipe 26 and the second regenerated catalyst pipe 36 may have the same inner diameter, d. The inner diameter D of the first spent catalyst pipe 24 and the second spent catalyst pipe 35 may be greater than the inner diameter d of the first regenerated catalyst pipe 26 and the second regenerated catalyst pipe 36.

Each of the inlet ends 27, 43, 51 and 53 have a slightly upturned slope from upstream to downstream toward the respective inlet 23, 33, 25 and 37 to provide an upward trajectory for the catalyst stream entering the reaction chamber 14. Additionally, a first spent inlet plate 71 may be provided below and inwardly of the first spent catalyst inlet 23. A second spent inlet plate 72 may be provided below and inwardly of the second spent catalyst inlet 33. A first regenerated inlet plate 73 may be provided below and inwardly of the first regenerated catalyst inlet 25. A second regenerated inlet plate 74 may be provided below and inwardly of the second regenerated catalyst inlet 37. The inlet plates 71-74 urge incoming catalyst streams upwardly rather than downwardly. The inlet plates 71-74 are attached to the wall 15 and may have a trapezoidal shape with the short side slightly curved and fastened to the wall. All of the catalyst inlets 23, 33, 25, 37 may be positioned about the same distance above the feed distributor 20 although other elevational arrangements are contemplated. Additionally, the catalyst inlets 23, 33, 25, 37 may be located on the same radius from center, although again other radial arrangements are contemplated.

Figure 3:
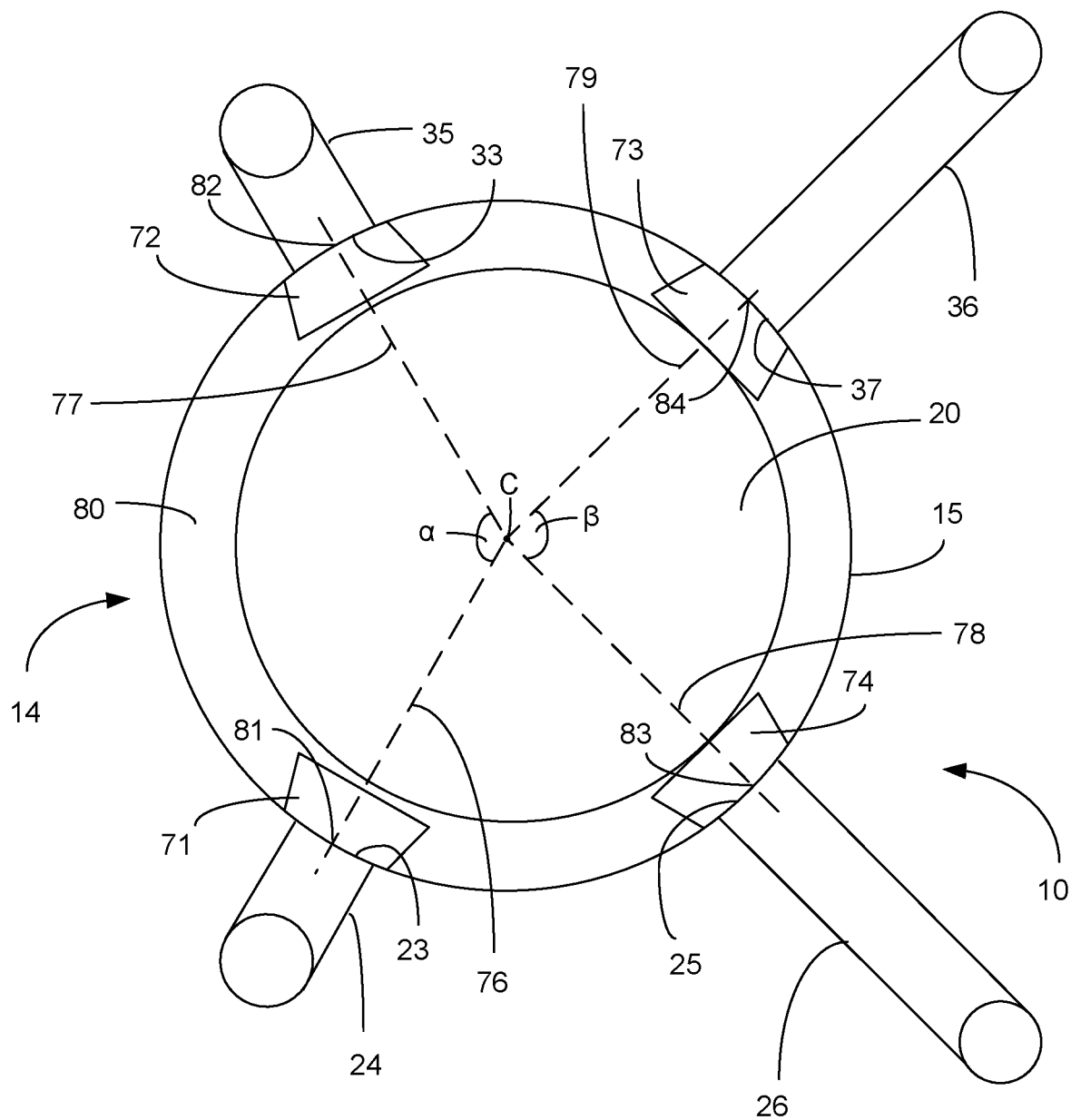
FIG. 3 is a plan, sectional view of the reaction chamber taken along segment 3-3 of FIG. 1.

FIG. 3 is a sectional plan view taken at segment 3-3 of FIG. 1 showing the reaction chamber 14. The inlet plates 71-74 block catalyst from exiting the respective catalyst inlet 23, 33, 25 and 37 and falling into a reactor 80 annulus between the distributor 20 and the wall 15 of the reaction chamber 14. It can be visualized in FIG. 3 that the catalyst pipes 24, 35, 26 and 36 do not extend into the reaction chamber 14 through the wall 15, although such extension is contemplated. The catalyst inlets 23, 33, 25 and 37 are all directed toward a center C of the reaction chamber 14. The second spent catalyst inlet 33 may be opposed to the first regenerated catalyst inlet 25. Consequently, the second spent catalyst stream is fed to the reactor 10 from the second spent catalyst inlet 33 in opposition to the first regenerated catalyst stream fed to the reactor from the first regenerated inlet 25. Moreover, the first spent catalyst inlet 23 may be opposed to the second regenerated catalyst inlet 37. Furthermore, the first spent catalyst stream may be fed to reactor 10 from the first spent catalyst inlet 23 in opposition to the second regenerated catalyst stream fed to the reactor from the second regenerated catalyst inlet 37.

A first spent longitudinal axis 76 of the first spent catalyst pipe 24 through the first spent axial center 81 of the first spent catalyst inlet 24 intersects the axial center C of the reaction chamber 14. A second spent longitudinal axis 77 of the second spent catalyst pipe 35 through the second spent axial center 82 of the second spent catalyst inlet 33 also intersects the axial center C of the reaction chamber 14. Moreover, a first regenerated longitudinal axis 78 of the first regenerated catalyst pipe 26 through the first regenerated axial center 83 of the first regenerated catalyst inlet 25 intersects the axial center C of the reaction chamber 14. Lastly, a second regenerated longitudinal axis 79 of the second regenerated catalyst pipe 36 through the second regenerated axial center 84 of the second spent catalyst inlet 37 intersects the axial center C of the reaction chamber 14. Typically, the recycle ratio of spent catalyst to regenerated catalyst will be greater than about 1 and typically about 1 to about 10. A greater flow rate of spent catalyst will be fed to the reaction chamber 14 than the regenerated catalyst.

To promote thorough mixing, a spent angle $\alpha$ between the first longitudinal axis 76 of the first spent catalyst inlet 23 and the second longitudinal axis 77 of the second spent catalyst inlet 33 is greater than a regenerated angle $\beta$ between the first regenerated longitudinal axis 79 of said first regenerated catalyst inlet 25 and the second regenerated longitudinal axis 78 of the second regenerated catalyst inlet 37. The first spent catalyst stream is fed to the reactor 10 at a first spent vector colinear with the first spent longitudinal axis 76, and the second spent catalyst stream is fed to the reactor at a second spent vector that is colinear with the second spent longitudinal axis 77. The first spent vector and the second spent vector define the spent angle α. The first regenerated catalyst stream is fed to the reactor 10 at a first regenerated vector that is colinear with the first regenerated longitudinal axis 79, and the second regenerated catalyst stream is fed to the reactor at a second regenerated vector that is colinear with the second regenerated longitudinal axis 78. The first regenerated vector and the second regenerated vector define the regenerated angle β.

The smaller and sharper regenerated catalyst angle β will enable the regenerated catalyst with a smaller flow rate to the reactor 10 to cut through the spent catalyst fed to the reactor with the larger spent angle α to achieve more uniform mixing of the catalyst streams. The spent angle may be between about 105 and about 135 degrees. The regenerated angle β may be between about 75 and less than about 105 degrees.

In the described arrangement, the first spent catalyst stream, the second spent catalyst stream, the first regenerated catalyst stream and perhaps the second regenerated catalyst stream mix to provide the mixed catalyst stream. The described arrangement provides thorough mixing of spent catalyst and regenerated catalyst, so as to enable uniform catalyst temperature and density in the reactor 10 to promote catalytic reactions over thermal cracking reactions.

EXAMPLE

We conducted a Computational Fluid Dynamics modeling of the reaction chamber 14 with two spent catalyst inlets 23, 33 and two regenerated catalyst inlets 25, 37 as described. At one=spent catalyst pipe diameter D above the top of all catalyst inlets 23, 33, 25 and 37, the greatest temperature differential among catalyst in a horizontal cross section is no more than 20° C. Moreover, at one spent catalyst pipe diameter D above the top of all catalyst inlets 23, 33, 25 and 37, the greatest density differential in a horizontal cross section is no more than 100 kg/m$^3$.

SPECIFIC EMBODIMENTS

While the following is described in conjunction with specific embodiments, it will be understood that this description is intended to illustrate and not limit the scope of the preceding description and the appended claims.

A first embodiment of the disclosure is an apparatus for contacting a feed stream with a catalyst stream comprising a reaction chamber; a first spent catalyst inlet for delivering a first spent catalyst stream to the reaction chamber, a second spent catalyst inlet for delivering a second spent catalyst stream to the reaction chamber, a feed inlet for charging feed to the reaction chamber; and a first regenerated catalyst inlet for delivering a first regenerated catalyst stream to the reaction chamber; and a separation chamber in communication with the reaction chamber and a product outlet for removing a product stream from the separation chamber. An embodiment of the disclosure is one, any or all of prior embodiments in this paragraph up through the first embodiment in this paragraph further comprising a first spent catalyst pipe having a first spent catalyst inlet end comprising the first spent catalyst inlet connected to the reaction chamber and a first spent catalyst outlet end connected to the separation chamber comprising the first spent catalyst outlet and a second spent catalyst pipe having a second spent catalyst inlet end comprising the second spent catalyst inlet connected to the reaction chamber and a second spent catalyst outlet end connected to the separation chamber comprising the second spent catalyst outlet. An embodiment of the disclosure is one, any or all of prior embodiments in this paragraph up through the first embodiment in this paragraph comprising a first regenerated catalyst pipe having a first regenerated catalyst inlet end comprising the first regenerated catalyst inlet connected to the reaction chamber and a first regenerated catalyst outlet end connected to the regenerator vessel. An embodiment of the disclosure is one, any or all of prior embodiments in this paragraph up through the first embodiment in this paragraph further comprising a second regenerated catalyst inlet for delivering a second regenerated catalyst stream to the reaction chamber. An embodiment of the disclosure is one, any or all of prior embodiments in this paragraph up through the first embodiment in this paragraph further comprising a second regenerated catalyst pipe having a second regenerated catalyst inlet end comprising the second regenerated catalyst inlet connected to the reaction chamber and a second regenerated catalyst outlet end connected to the regenerator vessel. An embodiment of the disclosure is one, any or all of prior embodiments in this paragraph up through the first embodiment in this paragraph the separation chamber comprising a first spent catalyst outlet and the first spent catalyst outlet end of the first spent catalyst pipe comprising the first spent catalyst outlet and the separation chamber comprising a second spent catalyst outlet and the second spent catalyst outlet end of the second spent catalyst pipe comprising the second spent catalyst outlet. An embodiment of the disclosure is one, any or all of prior embodiments in this paragraph up through the first embodiment in this paragraph wherein the first regenerated catalyst inlet is opposed to the second spent catalyst inlet. An embodiment of the disclosure is one, any or all of prior embodiments in this paragraph up through the first embodiment in this paragraph wherein the second regenerated catalyst inlet is opposed to the first spent catalyst inlet. An embodiment of the disclosure is one, any or all of prior embodiments in this paragraph up through the first embodiment in this paragraph further comprising a spent angle between a first spent longitudinal axis of the first spent catalyst inlet and a second spent longitudinal axis of the second spent catalyst inlet is greater than a regenerated angle between a first regenerated longitudinal axis of the first regenerated catalyst inlet and a second regenerated longitudinal axis of the second regenerated catalyst inlet. An embodiment of the disclosure is one, any or all of prior embodiments in this paragraph up through the first embodiment in this paragraph wherein the spent angle is between about 105 and about 135 degrees. An embodiment of the disclosure is one, any or all of prior embodiments in this paragraph up through the first embodiment in this paragraph wherein the regenerated angle is between about 75 and less than 105 degrees.

A second embodiment of the disclosure is a process for contacting a feed stream with fluidized catalyst comprising charging the feed stream to a reactor; feeding a first spent catalyst stream to the reactor and feeding a second spent catalyst stream to the reactor; feeding a first regenerated catalyst stream to the reactor; contacting the feed stream with the first spent catalyst stream, the second spent catalyst stream and the first regenerated catalyst stream to produce a product gas stream and spent catalyst; and separating the product gas stream from the spent catalyst. An embodiment of the disclosure is one, any or all of prior embodiments in this paragraph up through the second embodiment in this paragraph further comprising recycling the first spent catalyst stream and the second spent catalyst stream from the spent catalyst. An embodiment of the disclosure is one, any or all of prior embodiments in this paragraph up through the second embodiment in this paragraph further comprising feeding a second regenerated catalyst stream to the reactor. An embodiment of the disclosure is one, any or all of prior embodiments in this paragraph up through the second embodiment in this paragraph further comprising feeding the second spent catalyst stream to the reactor in opposition to the first regenerated catalyst stream. An embodiment of the disclosure is one, any or all of prior embodiments in this paragraph up through the second embodiment in this paragraph further comprising feeding the first spent catalyst stream to the reactor in opposition to the second regenerated catalyst stream. An embodiment of the disclosure is one, any or all of prior embodiments in this paragraph up through the second embodiment in this paragraph wherein the first spent catalyst stream is fed to the reactor at a first spent vector and the second spent catalyst stream is fed to the reactor at a second spent vector that defines a spent angle with the first spent vector and the first regenerated catalyst stream is fed to the reactor at a first regenerated vector and the second regenerated catalyst stream is fed to the reactor at a second regenerated vector that defines a regenerated angle with the first regenerated vector and the spent angle is greater than the regenerated angle. An embodiment of the disclosure is one, any or all of prior embodiments in this paragraph up through the second embodiment in this paragraph wherein the first spent catalyst stream, the second spent catalyst stream, the first regenerated catalyst stream and the second regenerated catalyst stream mix and at one spent catalyst pipe diameter above all catalyst inlets the temperature differential among catalyst in a cross section is no more than 20° C.

A third embodiment of the disclosure is a process for contacting a feed stream with fluidized catalyst comprising charging the feed stream to a reactor; feeding a first spent catalyst stream to the reactor; feeding a first regenerated catalyst stream to the reactor; mixing the first spent catalyst stream and the first regenerated catalyst stream such that at one spent catalyst pipe diameter above all catalyst inlets the temperature differential among catalyst in a cross section is no more than 20° C.; and contacting the feed stream with a mixture of the first spent catalyst stream and the first regenerated catalyst stream to produce a product gas stream and spent catalyst; and separating the product gas stream from the spent catalyst. An embodiment of the disclosure is one, any or all of prior embodiments in this paragraph up through the third embodiment in this paragraph further comprising feeding a second spent catalyst stream to the reactor and feeding a second regenerated catalyst stream to the reactor Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for contacting a feed stream with fluidized catalyst comprising:
   charging said feed stream to a reactor;
   feeding a first spent catalyst stream to said reactor and feeding a second spent catalyst stream to said reactor;
   feeding a first regenerated catalyst stream to said reactor;
   contacting said feed stream with the first spent catalyst stream, the second spent catalyst stream and the first regenerated catalyst stream to produce a product gas stream and spent catalyst; and
   separating said product gas stream from said spent catalyst,
   wherein a spent angle between a first longitudinal axis of a first spent catalyst inlet and a second longitudinal axis of a second spent catalyst inlet is between about 105 and about 135 degrees.

2. The process of claim 1 further comprising recycling said first spent catalyst stream and said second spent catalyst stream from said spent catalyst.

3. The process of claim 1 further comprising feeding a second regenerated catalyst stream to said reactor.

4. The process of claim 1 further comprising feeding the second spent catalyst stream to said reactor in opposition to the first regenerated catalyst stream.

5. The process of claim 3 further comprising feeding the first spent catalyst stream to said reactor in opposition to the second regenerated catalyst stream.

6. The process of claim 3 wherein the first spent catalyst stream is fed to the reactor at a first spent vector and the second spent catalyst stream is fed to the reactor at a second spent vector that defines a spent angle with the first spent vector and the first regenerated catalyst stream is fed to the reactor at a first regenerated vector and the second regenerated catalyst stream is fed to the reactor at a second regenerated vector that defines a regenerated angle with the first regenerated vector and the spent angle is greater than the regenerated angle.

7. The process of claim 3 wherein the first spent catalyst stream is fed to said reactor through a first spent catalyst pipe; the first spent catalyst stream, the second spent catalyst stream, the first regenerated catalyst stream and the second regenerated catalyst stream mix and at one spent catalyst pipe diameter of the first spent catalyst pipe above all catalyst inlets the temperature differential among catalyst in a cross section is no more than 20° C.

8. A process for contacting a feed stream with fluidized catalyst comprising:
   charging said feed stream to a reactor;
   feeding a first spent catalyst stream to said reactor through a spent catalyst pipe having a first spent catalyst pipe diameter;
   feeding a first regenerated catalyst stream to said reactor;
   feeding a second spent catalyst stream or a second regenerated catalyst stream to said reactor:
   mixing the first spent catalyst stream, the first regenerated catalyst stream, and the second spent catalyst stream or the second regenerated catalyst stream such that at one of said spent catalyst pipe diameter above all catalyst inlets the temperature differential among catalyst in a cross section is no more than 20° C.;
   contacting said feed stream with a mixture of the first spent catalyst stream the first regenerated catalyst stream, and the second spent catalyst stream or the second regenerated catalyst stream to produce a product gas stream and spent catalyst; and separating said product gas stream from said spent catalyst.

9. The process of claim 8 further comprising feeding a second spent catalyst stream to said reactor and feeding a second regenerated catalyst stream to said reactor.

10. A process for contacting a feed stream with fluidized catalyst comprising:

charging said feed stream to a reactor;

feeding a first spent catalyst stream to said reactor;

feeding a first regenerated catalyst stream to said reactor;

feeding a second spent catalyst stream or a second regenerated catalyst stream to said reactor;

contacting said feed stream with the first spent catalyst stream, the second spent catalyst stream, the first regenerated catalyst stream and the second regenerated catalyst stream to produce a product gas stream and spent catalyst; and separating said product gas stream from said spent catalyst, wherein a spent angle between a first longitudinal axis of a first spent catalyst inlet and a second longitudinal axis of a second spent catalyst inlet is greater than a regenerated angle between a first longitudinal axis of a first regenerated catalyst inlet and a second regenerated longitudinal axis of a second regenerated catalyst inlet.

* * * * *